United States Patent
Blanch et al.

(10) Patent No.: US 6,772,067 B2
(45) Date of Patent: Aug. 3, 2004

(54) ACOUSTIC LOGGING APPARATUS AND METHOD FOR ANISOTROPIC EARTH FORMATIONS

(75) Inventors: Joakim O. Blanch, Houston, TX (US); Georgios L. Varsamis, Houston, TX (US)

(73) Assignee: Halliburton Energy Services, Inc, Houston, TX (US)

(*) Notice: Subject to any disclaimer, the term of this patent is extended or adjusted under 35 U.S.C. 154(b) by 17 days.

(21) Appl. No.: 10/027,749

(22) Filed: Dec. 21, 2001

(65) Prior Publication Data

US 2003/0206488 A1 Nov. 6, 2003

Related U.S. Application Data

(63) Continuation of application No. 10/025,157, filed on Dec. 19, 2001.

(51) Int. Cl.⁷ .............................. G01V 1/28; G01V 1/00
(52) U.S. Cl. ........................................... 702/14; 367/38
(58) Field of Search ....................... 702/14, 11; 367/38, 367/75

(56) References Cited

U.S. PATENT DOCUMENTS

| | | | |
|---|---|---|---|
| 4,367,541 A | 1/1983 | Seeman | 367/34 |
| RE31,222 E | 4/1983 | McCracken | 364/571 |
| 4,594,691 A | 6/1986 | Kimball et al. | 367/32 |
| 4,648,039 A * | 3/1987 | Devaney et al. | 702/17 |
| 4,718,027 A | 1/1988 | Richardson et al. | 364/554 |
| 4,789,969 A * | 12/1988 | Naville | 367/36 |
| 4,794,572 A | 12/1988 | Sondergeld et al. | 367/31 |
| 4,803,666 A | 2/1989 | Alford | 367/36 |
| 4,817,061 A | 3/1989 | Alford et al. | 361/75 |
| 4,888,743 A | 12/1989 | Thomsen | 367/75 |
| 4,903,244 A | 2/1990 | Alford | 367/36 |
| 4,933,913 A | 6/1990 | Thomsen | 367/75 |
| 4,951,267 A * | 8/1990 | Chang et al. | 367/31 |
| 4,995,008 A * | 2/1991 | Hornbostel et al. | 367/75 |
| 5,027,332 A | 6/1991 | Alford | 367/75 |
| 5,029,146 A | 7/1991 | Alford | 367/75 |
| 5,081,611 A | 1/1992 | Hornby | 367/25 |
| 5,136,554 A | 8/1992 | Thomsen et al. | 367/75 |
| 5,214,613 A | 5/1993 | Esmersoy | 367/31 |
| 5,398,215 A * | 3/1995 | Sinha et al. | 367/31 |
| 5,541,890 A | 7/1996 | Tang | 367/34 |

(List continued on next page.)

OTHER PUBLICATIONS

Alain Brie, et al; *New Directions in Sonic Logging; Spring 1998;* (pp. 40–55); Oilfield Review.

Batakrishna Mandal, *ShearWave Anistrophy from Single Dipole Source* (undated).

(List continued on next page.)

*Primary Examiner*—John Barlow
*Assistant Examiner*—Toan M. Le
(74) *Attorney, Agent, or Firm*—Mark E. Scott; Conley Rose, P.C.

(57) ABSTRACT

The patent discloses a signal processing technique for determining the fast and slow shear wave polarizations, and their orientation, for acoustic waves in an anisotropic earth formation. The signal processing method decomposes composite received waveforms a number of times using a number of different strike angles. The decomposed signals are used to create estimated source signals. The estimated source signals are compared in some way to obtain an objective function. Locations in a plot where the objective function reaches minimum values are indicative of the acoustic velocity of the fast and slow polarizations within the formation.

27 Claims, 4 Drawing Sheets

U.S. PATENT DOCUMENTS

| | | | |
|---|---|---|---|
| 5,661,696 A | 8/1997 | Kimball et al. | 367/31 |
| 5,712,829 A | 1/1998 | Tang et al. | 367/75 |
| 5,740,124 A | 4/1998 | Chunduru et al. | 367/73 |
| 5,808,963 A | 9/1998 | Esmersoy | 367/31 |
| 5,835,452 A | 11/1998 | Mueller et al. | |
| 5,960,369 A | 9/1999 | Samaroo | 702/6 |
| 5,999,486 A | 12/1999 | DeVault | |
| 6,012,015 A | 1/2000 | Tubel | 702/6 |
| 6,061,633 A | 5/2000 | Fukuhara et al. | 702/6 |
| 6,088,294 A | 7/2000 | Leggett, III et al. | 367/25 |
| 6,098,021 A * | 8/2000 | Tang et al. | 702/14 |
| 6,188,961 B1 | 2/2001 | Mandal | 702/6 |
| 6,526,354 B2 * | 2/2003 | Bose et al. | 702/14 |

OTHER PUBLICATIONS

Chung Chang et al; *Localized Maps of the Subsurface;* (pp. 56–66) Spring 1998; Oilfield Review.

Greg Brewton, *the Geology of the Skinner, Bartlesville and Misener Sandstones in well DM21A at Catoosa;* Amoco publication, Nov. 1996.

B.A. Auld, *Acoustic Fields and Waves in Solids,* vol. 1 (pp. 68–423); A Wiley–Interscience Publication.

Klaas Koster et al., *Dipole Shear Anistropy Logging;* Amoco Publication SL3.7 (pp. 1139–1142).

*Faults and Faulting;* EAS–A193 Class Notes; SLU (9 pp.).

*Seismic Waves and Earth's Interior;* EAS–A193 Class Notes; SLU (13 pp).

Dr. Daniel A. Russelle; *Sound Fields Radiated by Simple Sources;* Kettering University (4 pp.).

Ningya Cheng et al.; *Borehole Geophysics 1: Well Logging; Decomposition and particle motion of acoustic dipole log in anisotropic formation;* Earth Resources Lab MIT.

J.O. Blanch, et al., A Method to Extract Fast and Slow Shear Wave Velocities in an Anisotropic Formation; SEG International Exposition and 72nd Annual Meeting, Oct. 11, 2002.

Phillip M. Carrion, et al., Source Wavelet and its Angular Spectrum from Plane–Wave Seismograms; Geophysics, vol. 55, No. 8, (Aug. 1990); pp. 1026–2035.

Chuen Hon Cheng, et al., Elastic Wave Propagation in a Fluid–Filled Borehole and Synthetic Acoustic Logs; Geophysics, vol. 46, No. 7, (Jul. 1981); pp. 1042–1053.

* cited by examiner

Start Time

ACOUSTIC LOGGING APPARATUS AND METHOD FOR ANISOTROPIC EARTH FORMATIONS

CROSS-REFERENCE TO RELATED APPLICATIONS

This application is related to co-pending application Ser. No. 10/025,528, filed Dec. 18, 2001 titled "Acoustic Logging Apparatus And Method" and is a continuation of application Ser. No. 10/025,157 filed Dec. 19, 2001, titled "Acoustic Logging Apparatus and Method for Anisotropic Earth Formations."

STATEMENT REGARDING FEDERALLY SPONSORED RESEARCH OR DEVELOPMENT

Not applicable.

BACKGROUND OF THE INVENTION

1. Field of the Invention

The present invention generally relates to acoustic well logging. More particularly, the present invention relates to determining slow and fast shear wave velocities and orientations in an anisotropic earth formation.

2. Description of the Related Art

It is a well known phenomena that certain earth formations exhibit a property called "anisotropy", wherein the velocity of acoustic waves polarized in one direction may be somewhat different than the velocity of acoustic waves polarized in a different direction within the same earth formation. See, for example, S. Crampin, *A Review of the Effects of Anisotropic Layering on the Propagation of Seismic Waves*, Geophys. J. R. Astr. Soc., vol. 49, pp 9–27, 1977, incorporated herein by reference as if reproduced in full below. Anisotropy may arise from intrinsic structural properties, such as grain alignment, crystallization, aligned fractures, or from unequal stresses within the formation. Anisotropy is particularly of interest in the measurement of the velocity of shear/flexural waves propagating in the earth formations. Shear or S waves are often called transverse waves because the particle motion is in a direction "transverse", or perpendicular, to the direction that the wave is traveling.

Acoustic waves travel fastest when the direction of particle motion polarization direction) is aligned with the material's stiffest direction. If the formation is anisotropic, meaning that there is one direction that is stiffer than another, then the component of particle motion aligned in the stiff direction travels faster than the wave component aligned in the other, more compliant direction in the same plane. A shear wave induced into an anisotropic formation splits into two components, one polarized along the formation's stiff (or fast) direction, and the other polarized along the formation's compliant (or slow) direction Generally, the orientation of these two polarizations is substantially orthogonal (components which are at a 90° angle relative to each other). The fast wave is polarized along the direction parallel to the fracture strike and a slow wave in the direction perpendicular to it.

Acoustic well logging techniques have been devised for determining the amount of anisotropy from the shear wave velocities (slowness), and the amount of anisotropy is generally defined as the difference between the velocities of the fast and the slow shear waves. One method of determining fast and slow shear wave velocities and orientations uses an acoustic logging tool 100, as shown in FIG. 1, to detect components of the acoustic signals at several levels of dipole receivers. See, for example U.S. Pat. No. 5,712,829 (hereinafter "the '829 patent") issued to Tang et al., incorporated herein by reference as if reproduced in full below.

In the '829 patent, two dipole sources X and Y, 102, are oriented orthogonal to each other. Signals detected by the dipole receivers A 104, parallel to the X source, are referred to as XA signals when the X source is triggered. Similarly, signals detected by dipole receivers B 106, parallel to the Y source 102, are referred to as YB signals when the Y source is triggered. Cross-component signals can also be detected by the perpendicular receivers when each source is energized, and these signals are referred to as the XB and YA signals for the X and Y sources respectively. Thus, a total of four sets of signals are created for each dipole receiver pair for each set of firings of the sources X and Y.

Each of the four sets of signals can be represented as a time series, each of which consists of a series of numbers indexed with respect to increasing time from the instant at which the respective source is energized. The abscissa value in each series of numbers represents amplitude of the received signal. It must be understood, however, that the signal received by any particular receiver, regardless of which transmitter was fired, contains information about both the fast and the slow waves. Stated otherwise, the signal received by any particular dipole receiver is a combination of the signal induced by the fast wave and the signal induced by the slow wave. Determining the slowness of the fast and slow waves involves separating the fast and slow signals from the actual received signals. Various solutions to determine the fast and slow waveforms from the received signals incorporating both exist, for example, in U.S. Pat. No. 4,817,061 issued to Alford et al., incorporated herein by reference as if reproduced in fall below. Once the fast and slow waveforms are decomposed from the composite received waveforms, prior art acoustic determinations are made as to the slowness of each of the waves. In particular, this slowness determination typically involves determining a coherence/semblance of the decomposed waveforms.

While semblance may create visually pleasing results, determining slowness in this matter is unsuitable for error estimation. Consequently, an improved method to determine fast and slow shear wave velocity and orientation in an anisotropic formation is desired.

SUMMARY OF SOME OF THE PREFERRED EMBODIMENTS

The preferred embodiments of the present invention comprise a method and apparatus for determining the slowness and orientation of the fast and slow shear waves in an anisotropic earth formation. The apparatus for making this determination preferably comprises two dipole transmitters, oriented substantially perpendicular to each other, mounted on a tool and designed for imparting acoustic energy into the surrounding formation. The tool further comprises a plurality of dipole receiver pairs, the receiver pairs spaced apart from each other and from the dipole transmitters. The dipole receivers in each dipole receiver pair are preferably oriented substantially perpendicular to each other. The preferred method of operation involves firing each dipole transmitter at each depth level sequentially, and obtaining a plurality of received composite signals with the dipole receivers, as the tool is slowly raised or lowered in the borehole. Each of the received signals is a composite signal containing information about the fast and slow shear waves. Each receiver pair on the same elevation creates four received signals for each set of transmitter firings.

A plurality of transfer functions of the formation are assumed and a series of source waveforms or wavelets are estimated using the received waveforms and the assumed transfer functions. More particularly, the preferred embodiments assume a transfer function for the formation at issue, and then estimate, using each set of received signals, a series of source signals that created the received signals based on the assumed transfer function. An objective function is created which is indicative of the similarity of the estimated source signals. Because the actual source signals are preferably the same, a low value of the objective function indicates that the assumed formation transfer function was close to the actual formation transfer function. The source estimation preferably is repeated using multiple transfer functions (assumed strike angles and slowness values). The values of the objective function calculated are preferably plotted in a starting time verses slowness verses strike angle graph, with the strike angle being the ordinate, the slowness being the abscissa, and the starting time being the Z axis coordinate. Thus, for a series of assumed transfer functions, all at a particular single strike angle, a vertical plane of information is created. The process is repeated for a series of assumed strike angles ranging from −90° to +90° (for a total of 180°), and at a plurality of slowness values within each assumed transfer function. From mini in the graph, the orientations of the fast and slow axis may be determined, the difference in slowness between the fast and slow waves maybe determined, and the error of the slowness calculation determined.

The disclosed device comprises a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a more detailed description of the preferred embodiments of the present invention, reference will now be made to the accompanying drawings, wherein.

NOTATION AND NOMENCLATURE

Certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . "

DETAILED DESCRIPTION OF THE PREFERRED EMBODIMENTS

Figure 1:
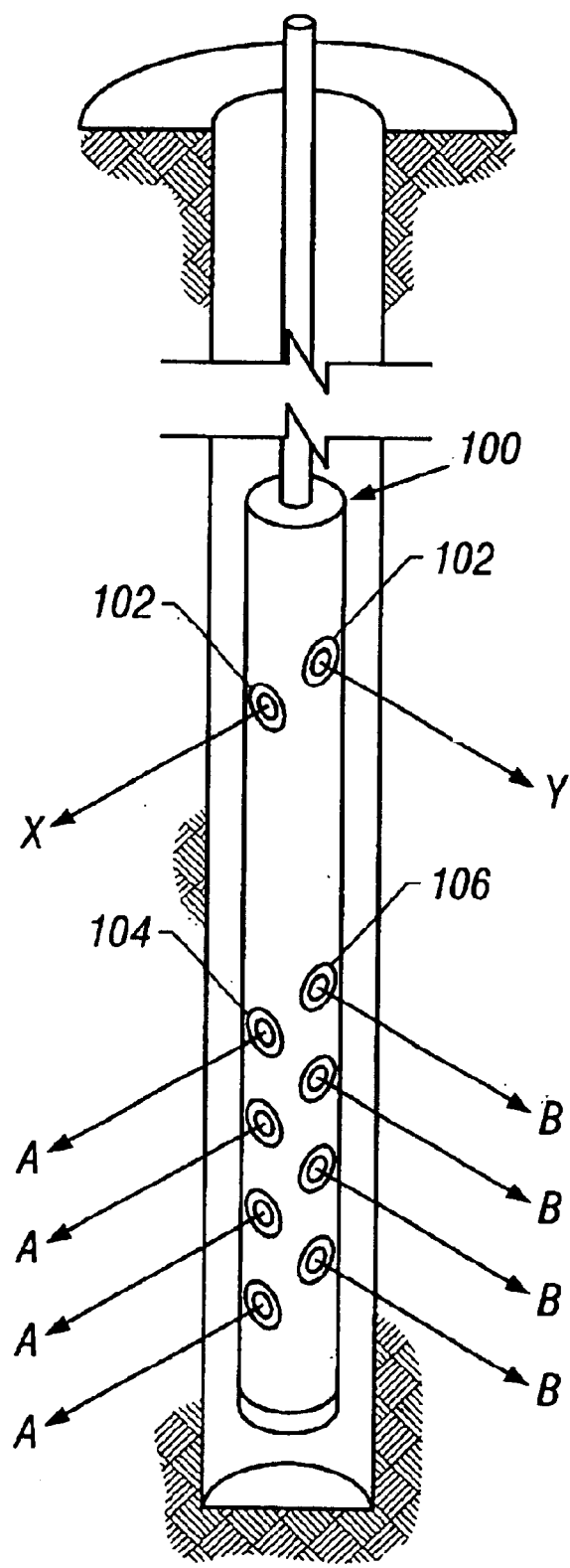
FIG. 1 shows a prior art acoustic logging tool.
Figure 2:
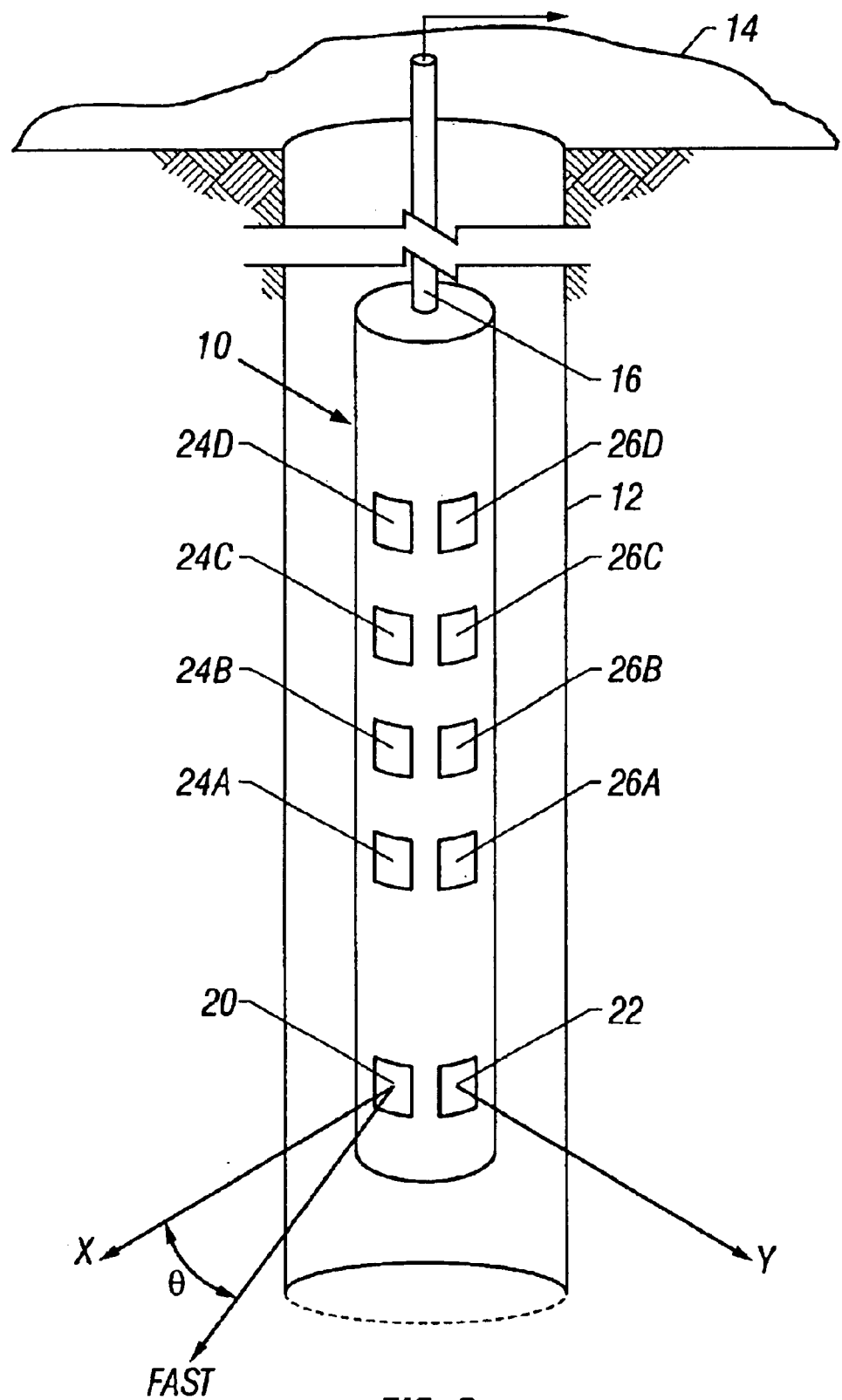
FIG. 2 shows a wireline acoustic Jogging tool of the preferred embodiment.

FIG. 2 shows an acoustic logging device 10 constructed in accordance with the preferred embodiments. In particular, FIG. 2 shows the tool 10 disposed within a fluid filled borehole 12 at some distance below the surface 14. The tool 10 is preferably suspended within the borehole by means of a multi-conductor armored cable 16. Thus, the tool 10 of the preferred embodiment is a wireline device. However, it must be understood that the principles described herein may likewise be practiced in a measuring-while-drilling (MWD) or logging-while-drilling (LWD) system.

The tool 10 preferably comprises a set of dipole transmitters: a first dipole transmitter 20, and a second dipole transmitter 22. In the perspective view of FIG. 2, only one face of each of the dipole transmitters 20, 22 may be seen. However, one of ordinary skill in the art understands that a complimentary face of each dipole transmitter 20 and 22 is present on a back surface of the tool 10. The dipole transmitters each may be a single dipole transmitter extending through the center of the tool 10, or may be individual transmitters fired in such a way as to act in a dipole fashion. The transmitter 20 induces its acoustic energy along an axis, which for convenience of discussion is labeled X in the FIG. 2. Transmitter 22 preferably induces energy along its axis labeled Y in FIG. 2, where the X and Y axes (and therefore transmitters 20, 22) are preferably orthogonal. The orthogonal relationship of the transmitters 20, 22 need not necessarily be the case, but a deviation from an orthogonal relationship complicates the decomposition of the waveforms.

Tool 10 also comprises a plurality of receiver pairs at elevations spaced apart from the transmitters 20, 22. In particular, the preferred embodiment comprises four pairs of dipole receivers. However, any number of receiver pairs may be used without departing from the spirit and scope of the invention. In FIG. 2, the receivers are labeled 24A–D and 26A–D. Preferably, each set of dipole receivers at a particular elevation has one receiver whose axis is coplanar with the axis of transmitter 20 (in the X direction) and one receiver whose axis is coplanar with the axis of transmitter 22 (in the Y direction). For example, one set of dipole receivers could be receivers 24A and 26A. Thus, the dipole receivers whose axes are coplanar with the axis of transmitter 20 are the transmitters 24A–D. Likewise the dipole receivers whose axes are coplanar with the axis of transmitter 22 are receivers 26A–D. While it is preferred that the axes of the receivers be coplanar with the axes of one of the transmitters, this is not required. However, azimuthly rotating any of the receiver pairs complicates the trigonometric relationships and, therefore, the data processing.

In broad terms, the processing method of the preferred embodiment comprises calculating or estimating source signals or source wavelets that created each set of received signals by assuming a transfer function of the formation. Estimating source wavelets can be described mathematically as follows:

$$S_{EST_i}(t) = [TF]^{-1} R_i(t) \quad (1)$$

where $S_{EST_i}$ is the estimated source signal calculated for the ith set of receivers, [TF] is the assumed transfer function of the formation in the source to receiver propagation, and $R_i$ is the decomposed waveforms (described below) for the ith receiver set. Thus, for each set of received signals $R_i$, an estimate of the source signal $S_{EST_i}$ is created. The estimated source signals are compared in some way to create an objective function. Minimas of a graph of the objective function are indicative of the angle of the anisotropy, and the slowness of the acoustic waves through the formation. Further, depending on the type objective function used, one or both of the value of the objection function at the minimas, and the curvature of the of the objective function plot near the minimas, are indicative of the error of the slowness determination.

Thus, a primary component of the source signal estimation is the assumed transfer function [TF]. The transfer function may be relatively simple, taking into account only the finite speed at which the acoustic signals propagate and the strike angle, or may be very complex, to include estimations of attenuation of the transmitted signal in the formation, paths of travel of the acoustic signals, the many different propagation modes within the formation (e.g. compressional waves, sheer waves, Stonely waves), and if desired even the effects of the acoustic waves crossing boundaries between different layers of earth formations. For reasons of simplicity of the calculation, the preferred estimated transfer functions take into account only the propagation speed (slowness) of the acoustic energy in the formation and the strike angle of the anisotropy.

As discussed in the Background section, anisotropic earth formations tend to break an induced shear wave into two components: one of those components traveling along the faster polarization direction, and the second component traveling along the slower polarization direction, where those two directions are substantially orthogonal. The relationship of the fast and slow polarizations within the formation, however, rarely lines up with the orthogonal relationship of the dipole transmitters 20, 22. For convenience of the following discussion and mathematical formulas, a strike angle θ is defined to be the angle between the X direction orientation (the axis of dipole transmitter 20) and the faster of the two shear wave polarizations (see FIG. 2). Further, it must be understood that the shear wave of interest does not propagate in the X or Y direction, but instead propagates in the Z direction along the borehole wall.

Operation of the tool 10 involves alternative firings of the transmitters 20, 22. Each of the receivers 24A–D and 26A–D create received waveforms designated R, starting at the firing of a particular transmitter. Each of the received waveforms or signals has the following notation: $R_{[receiver][source]}$. Thus, for the firing of transmitter 20 in the X direction, and receipt by one of the receivers having an axis coplanar to the axis of transmitter 20 (receivers 24A–D), the time series received signal is designated as $R_{XX}$. Likewise, the cross-component signal, the signal received by the dipole receiver whose axis is substantially perpendicular to the axis of the firing transmitter, is designated $R_{YX}$ in this situation. In similar fashion, firing of the transmitter whose axis is oriented in the Y direction, transmitter 22, results in a plurality of received signals designated as $R_{YY}$ for the axially parallel receivers, and $R_{XY}$ for the cross-components. Thus, each transmitter firing creates two received signals, one for each receiver of the dipole receiver pair. It follows that for a set of dipole transmitter firings, four signals are received at each receiver pair indicative of the acoustic signals propagated through the formation.

Each of the received signals in the case described above contains components of both the fast and slow shear waves—composite signals. That is, for example, an $R_{XX}$ receiver signal contains information regarding both the fast and slow polarized signals. These composite signals may be decomposed into their fast and slow components using equations as follows:

$$FP(t)=\cos^2(\theta)R_{XX}(t)+\sin(\theta)\cos(\theta)[R_{XY}(t)+R_{YX}(t)]+\sin^2(\theta)R_{YY}(t) \quad (2)$$

$$SP(t)=\sin^2(\theta)R_{XX}(t)-\cos(\theta)\sin(\theta)[R_{XY}(t)+R_{YX}(t)]+\cos^2(\theta)R_{YY}(t) \quad (3)$$

$$\sin(2\theta)[R_{XX}(t)-R_{YY}(t)]-\cos(2\theta)[R_{XY}(t)+R_{YX}(t)]=0 \quad (4)$$

where FP(t) is the fast polarization time series, SP(t) is the slow polarization time series, and θ is the strike angle as defied above. The prior art technique for decomposing the multiple received composite signals involved determining the strike angle θ by solving equation (4) above, and using that strike angle in equations (2) and (3) to decompose the composite signals into the fast and slow time series. The preferred embodiments of this invention take a different tact.

A close inspection of equations (2) and (3) above for the fast and slow polarization time series respectively shows two very symmetric equations. Taking into account the trigonometric relationships:

$$\sin\theta=\cos(90°-\theta) \quad (5)$$

$$\cos\theta=\sin(90°-\theta) \quad (6)$$

it may be recognized that either the fast polarization equation (2) or the slow polarization equation (3) may be used to obtain either the fast or slow polarization signals by appropriately adjusting the angle θ used in the calculation. Stated otherwise, either the fast or slow polarization equations (2) or (3) may be used to decompose a received signal having both fast and slow components into individual components if the strike angle θ is appropriately adjusted.

Rather than using a single strike angle in both equations (2) and (3) above, in the preferred embodiments each assumed transfer function comprises a strike angle. A plurality of transfer functions are assumed over the course of the slowness determination, and thus a plurality of strike angles are used, preferably spanning possible strike angles from −90° to +90° (180°). For each assumed transfer function (and thus strike angle), the four received signals generated by a set of receivers at each elevation are decomposed using the following equation:

$$DS(t)\cos^2(\theta)R_{XX}(t)+\sin(\theta)\cos(\theta)[R_{XY}(t)+R_{YX}(t)]+\sin^2(\theta)R_{YY}(t) \quad (7)$$

where DS(t) is simply the decomposed signal for the particular strike angle used. This process is preferably repeated for each set of received signals at each level for each assumed transfer function. Equation (7) is equation (2) above; however, equation (3) may be equivalently used if the assumed strike angle is appropriately adjusted.

Figure 3:
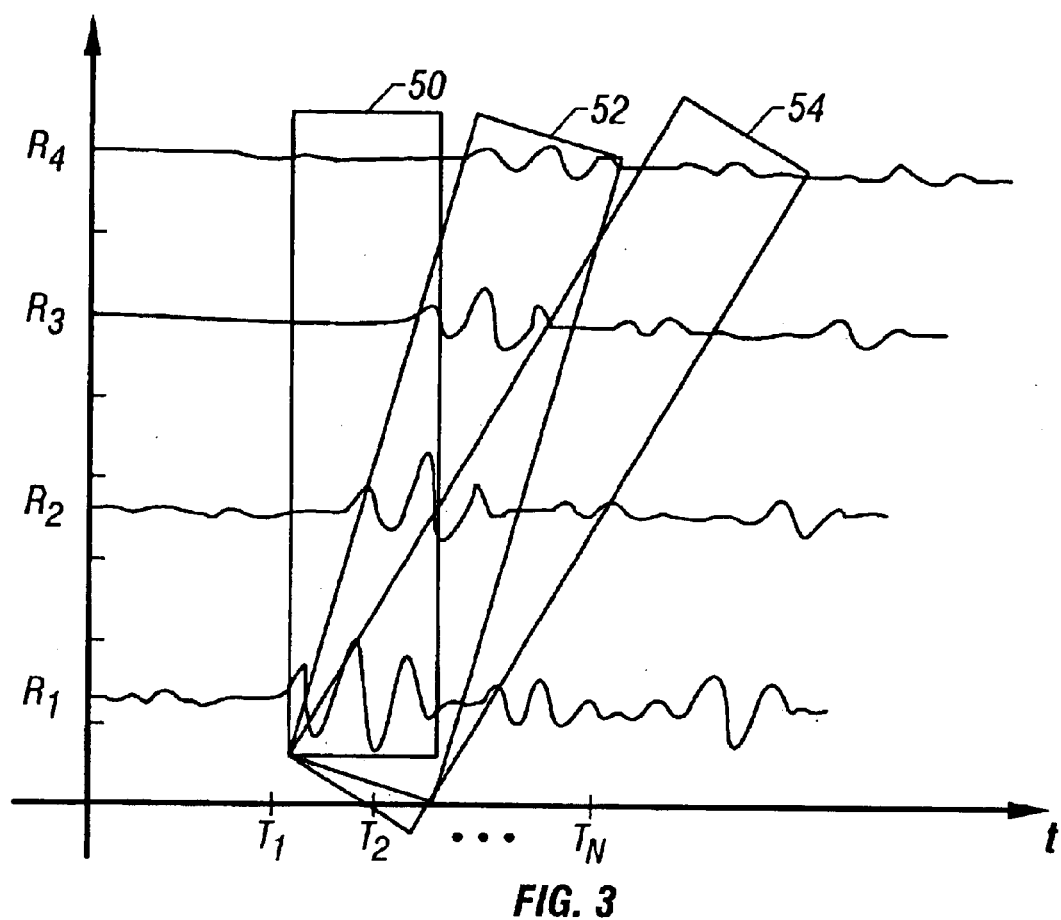
FIG. 3 shows an exemplary set of decomposed received signals.

FIG. 3 shows an exemplary set of four decomposed signals that in the preferred embodiment are created using equation (7) above for a particular transfer function (strike angle). In the exemplary set of decomposed signals, R1 could be the decomposed signal created using the strike angle from the assumed transfer function and the composite signals received by the set of receivers 24A, 26A. Likewise, decomposed signal R2 could be the decomposed signal created again using the strike angle from the assumed transfer function and the composite signals created by the set of receivers 24B, 26B. Notice how the amplitude of the decomposed signal of the set of receivers closest to the transmitters, decomposed signal R1, is greater than the decomposed signals of the more distant receivers, for example R4. Note also how the waveforms shift out in time from the closest to the more distant receivers, which is indicative of the finite speed of the acoustic waves within the formation.

For a particular starting time within the decomposed signals, for example starting time $T_1$ in FIG. 3, and for a first assumed transfer function having an assumed strike angle and slowness, portions of each decomposed signal are identified as being related based on the transfer function.

Rectangular time slice 50 of FIG. 3 is representative of a slowness in an assumed transfer function (with the assumed strike angle used to create the decomposed signals exemplified in FIG. 3). In particular, the slope of the rectangular time slice is indicative of the slowness of the assumed transfer function. Stated another way, the portions of the decomposed signals within the rectangular time slice 50 should correspond based on the assumed slowness of the formation of the transfer function. The time width of the samples taken from each of the received signals is preferably at least as long as each of the source signals in a firing set. In this way, an entire source waveform or source wavelet may be estimated. However, the time width of the samples taken from the decomposed signals need not necessarily be this width, as shorter and longer times would be operational.

Thus, the portions of the decomposed signals in the rectangular time slice 50 are each used to create an estimated source signal. These estimated source signals are compared to create an objective function that is indicative of their similarity. The process of assuming a transfer function, estimating source wavelets based on decomposed signals and creating an objective function is repeated a plurality of times. The rectangular time slices 50 through 54 are exemplary of multiple assumed transfer functions used in association with starting time $T_1$ (and the a strike angle used to create the decomposed signals). Estimating source wavelets in this fashion (including multiple assumed transfer functions) is preferably also repeated at multiple starting times within the decomposed signals, represented in FIG. 3 as $T_1, T_2 \ldots T_N$.

Figure 4:
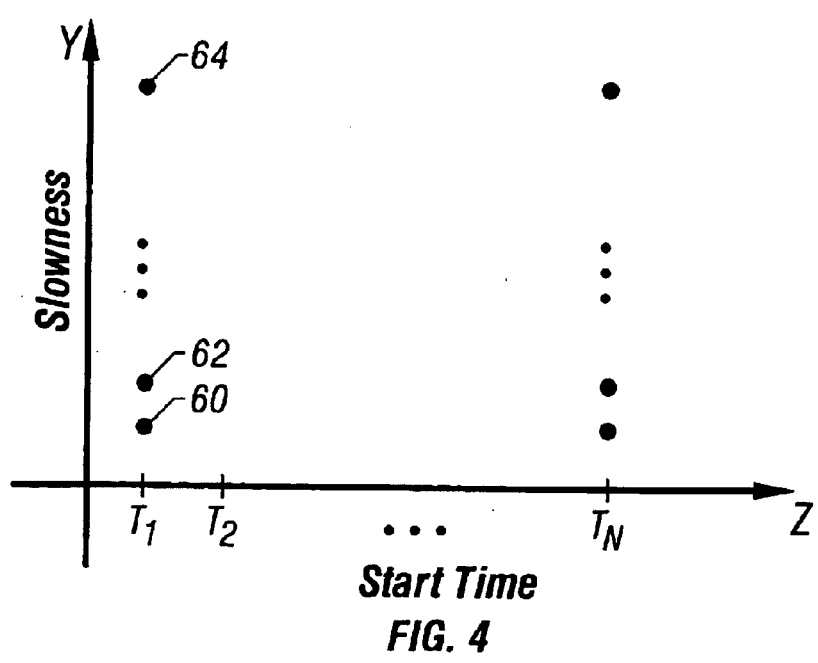
FIG. 4 shows an exemplary plot indicating how objective function values are placed in the plots of the preferred embodiment.

The value of the objective function created for each assumed transfer function and starting time is preferably plotted in a graph as a function of the starting time and the slowness of assumed transfer function. As shown in FIG. 4, the starting time of the source signal estimations, $T_1, T_2 \ldots T_n$, are preferably the Z axis coordinate (assumed strike angle is the ordinate or X axis (not shown in FIG. 4), as is discussed more below) and the slowness is preferably the abscissa or Y axis. Thus, for example, the value of the objective function calculated using portions of decomposed signals $R_1$–$R_4$ within rectangular time slice 50 is plotted at point 60 in FIG. 4. Likewise, the value of the objective function associated with the assumed slowness implied by rectangular time slice 52 is plotted at point 62, and the value of the objective function associated with the rectangular time slice 54 is shown at point 64. Thus, for each of a plurality of starting times, and for each starting time a plurality of slowness values associated with assumed transfer functions, a graph of the objective function is created. In the preferred embodiments, the value of the objective function is indicated by a color, with cooler colors (blues, purples) showing more similarity, and hotter colors (reds, oranges) showing less similarity of the estimated source signals or source wavelets. The color schemes however are only exemplary and other schemes may be used without departing from the scope and spirit of the invention.

Calculating the objective function of the a first embodiment preferably comprises comparing estimated source signals to determine a variance between them. More particularly, this slowness determination preferably comprises calculating an average of the estimated source signals within each time slice, and then calculating a variance against the average source signal. In more mathematical terms, for each assumed transfer function, a series of estimated source waveforms or signals $S_{EST_i}$ are calculated using equation (1) above. From these estimated source signals, an average estimated source signal is preferably calculated as follows:

$$S_{EST_{AVG}}(t) = \frac{1}{N}\sum_{i=1}^{N} S_{EST_i}(t) \tag{8}$$

where $S_{EST_{AVG}}$ is the average estimated source signal, N is the number of decomposed received signals, $S_{EST_i}$ is the source wavelet estimated for each decomposed received signal within the time slice, and t is time within the various time series.

The average estimated source signal is used to calculate a value representing the variance of the estimated source signals from the average estimated source signal. The variance is preferably calculated as follows:

$$\delta^2 = \sum_{i=1}^{N} (S_{EST_i}(t) - S_{EST_{AVG}}(t))^2 \tag{9}$$

where $\delta^2$ is the variance. In one embodiment, the variance value is the objective function plotted in the slowness versus starting time versus strike angle graph Large values of the variance indicate that the assumed transfer function (assumed strike angle and/or assumed slowness) did not significantly match the actual formation properties. Likewise, small values of the variance indicate that the assumed transfer function closely matched the actual formation properties. Thus, the minimas of the objective function in the plot described above indicate the slowness of the fast and slow polarized waves as well as the actual strike angle (this determination further exemplified in the discussion with respect to FIG. 5 below). The value of the variance objective function at the minimas is indicative of the error of the determination of the acoustic velocity and strike angle. Relatedly, the curvature of the variance objective function plot at the minima is indicative of the error of the calculation.

A second embodiment for calculating an objective function is based on determining a difference between each estimated source signal. In particular, and referring again to FIG. 3, consider the portions of the decomposed signals within rectangular time slice 50 associating with starting time $T_1$. As discussed above, using the assumed transfer function, an estimated source signal is created using the portions of the decomposed signal within the time slice 50. Differences or differentials are calculated between each estimated source signal, for example between the source signal estimated from a portion of the R1 signal and the source signal estimated from the portion of the R2 signal. This difference is preferably calculated between each succeeding receiver, and the objective function in this embodiment is the sum of the square of each difference calculation. Much like plotting the variance objective function, this differential objective function is preferably plotted as a function of slowness, starting time and strike angle. However, the graph obtained using the differential slowness calculation has slower transitions from maximas to minimas which therefore makes determining the minimas (indicative of the actual slowness of the fast and slow polarizations) easier than in cases where the graph has relatively steep slopes between minima and maxima More mathematically, the objective function of this second embodiment is calculated as follows:

$$\zeta = \sum_{i=1}^{N-1} (S_{EST_{i+1}} - S_{EST_i})^2 \quad (10)$$

where $\zeta$ is the objective function, and N is the number of receivers. Much like using the variance as the objective function, this differential objective function is preferably plotted in a slowness versus starting time versus strike angle graph, with cooler colors representing less difference between received signals, and hotter colors representing greater differences. Known techniques may be used to determine minima of these graphs, and the locations of the minima are indicative of formation slowness and the strike angle.

Neither of the two embodiments of calculating objective functions described above, variance and differential, are more preferred, as each have their own advantages. Plots of the variance objective value have steep slopes between maxima and minima, and thus the minima are better defined and the results more accurate. However, the differential objective value system has slower transitions from maxima to minima, making the determination of the minima by computer program easier. Thus, either may be used in any particular circumstance, and it is possible that both may be used in a single system.

Figure 5:
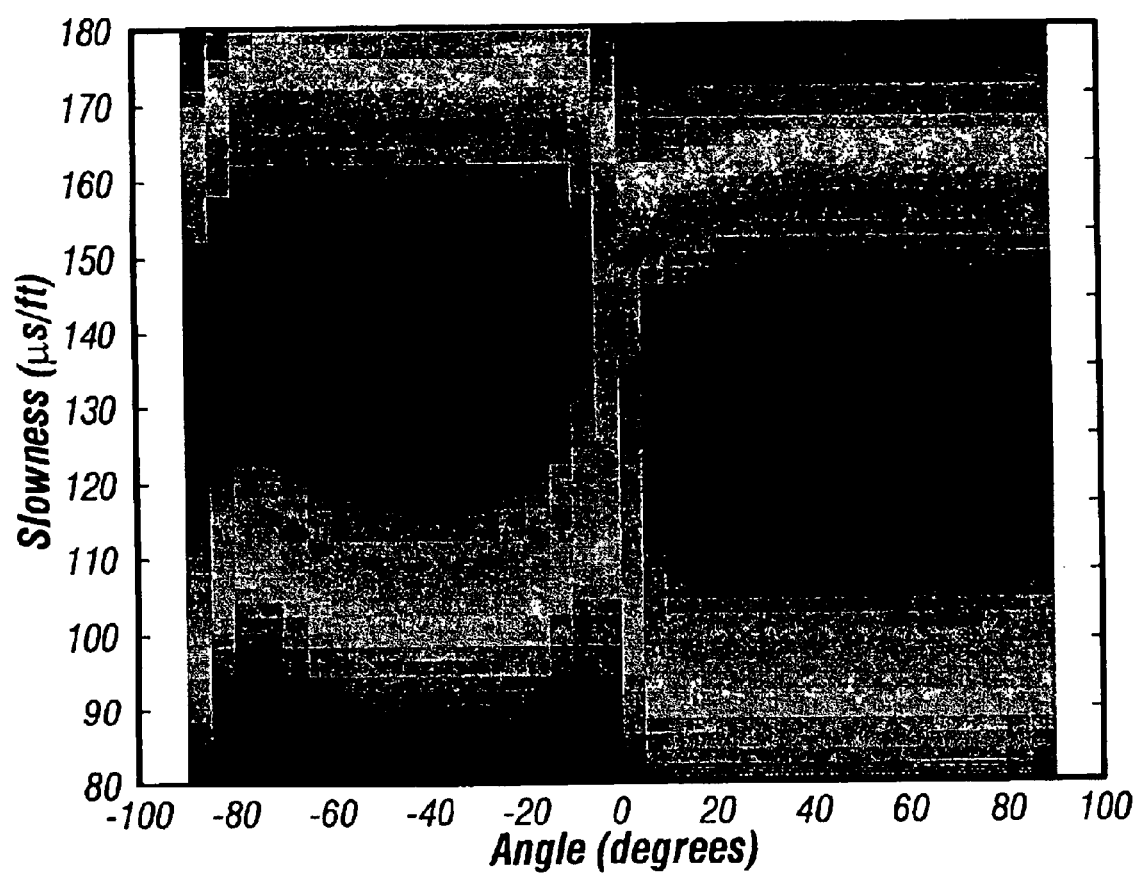
FIG. 5 shows a black and white exemplary plot of an objective function against slowness and strike angle.

FIG. 5 shows a black and white version of an exemplary slice (to create a two dimension graph) of a three dimensional graph of the objective function of the preferred embodiment. With reference to FIG. 3, preferably slowness is the abscissa, starting time is the Z coordinate, and strike angle is the ordinate (extending out of the page). The plot of FIG. 5 is a vertical slice of the three dimensional plot at a particular starting time, e.g. T1, such what is produced is a two dimensional plot as a function of slowness and strike angle. As can be seen from FIG. 5, the slower of the two polarized shear waves has a slowness of approximately 140 micro-seconds per foot ($\mu s/ft$), and is polarized at approximately $-45°$. Likewise, the faster of the two polarized waves has a slowness of approximately 125 $\mu s/ft$, and is polarized at approximately $+45°$. As discussed above, the two regions of lower objective function values are preferably plotted in color, with lower objective function values taking on cooler colors. FIG. 5 however, being black and white, shows these only as darker shades of gray. By analyzing the three dimensional plot, using known techniques, to find minimas of the objective function, characteristics of the formation may be determined. These characteristics may comprise the fast and slow shear wave velocities, strike angle of the anisotropy (as well as the relative angle between the two waves), and an indication of the error in the calculation (the value of the objective function at the minimas). Another error indication is the calculated difference in angle between the fast and slow wave. Theoretically, the angle should be 90 degrees. A departure from the 90 degree theoretical value may be used as an estimate of the error of the strike angle calculation.

Numerous variations and modifications will become apparent to those skilled in the art once the above disclosure is fully appreciated. For example, the disclosed method for determining shear wave velocity and orientation may be implemented using any number of receiver levels and different receiver types for the acoustic logging tool. Indeed, even a single set of dipole receivers may be used relying on rotation of the tool to obtain additional composite signals for decomposition. Further, the source may be located at any arbitrary angle relative to the receivers. Moreover, processing of the data after collection at receivers can be performed downhole in real time with only the results being transferred uphole to a computer system for storage. Throughout this discussion, the various earth formation characteristics were discussed with reference to finding minimas of the objective function. However, one of ordinary skill in the art could easily invert the values used, thus making a determination a search for maximum values in the plot, and this would not deviate from the scope and spirit of the invention. While assuming the transfer functions in the embodiments described involved also assuming a strike angle, it is possible that the transfer function need not include a strike angle estimation, and instead the composite signals could be decomposed for the range of possible strike angles independent of an assumed transfer function. Relatedly, it is possible to solve for the strike angle using equation (4) above and decompose the composite waveforms using that strike angle; and thereafter, estimate and apply transfer functions to the decomposed signals, thus also removing the strike angle from the transfer function. It is intended that the following claims be interpreted to embrace all such variations and modifications.

What is claimed is:

1. A method of determining characteristics of an anisotropic earth formation, the method comprising:

transmitting acoustic energy into the earth formation, and wherein the earth formation breaks the acoustic energy into a fast polarization shear wave and a slow polarization shear wave;

receiving composite waveforms comprising components of both the, fast and slow polarization shear waves;

decomposing the composite waveforms into decomposed waveforms;

estimating source waveforms from the decomposed waveforms to create estimated source waveforms; and comparing the estimated source waveforms to determine characteristics of the anisotropic earth formation.

2. The method of determining characteristics of an anisotropic earth formation as defined in claim 1 wherein transmitting acoustic energy into the earth formation further comprises:

firing a first dipole transmitter in a first axial direction; then firing a second dipole transmitter in an axial direction substantially azimuthaly perpendicular to the first axial direction.

3. The method of determining characteristics of an anisotropic earth formation as defined in claim 2 wherein receiving composite waveforms comprising components of both the fast and slow polarization shear waves further comprises:

receiving a first set of composite waveforms with a first dipole receiver pair associated with the firing of the first dipole transmitter;

receiving a second set of composite waveforms with a second dipole receiver pair associated with the firing of the first dipole transmitter;

receiving a third set of composite waveforms with the first dipole receiver pair associated with the firing of the second dipole transmitter; and receiving a fourth set of composite waveforms with the second dipole receiver pair associated with the firing of the second dipole transmitter.

4. The method of determining characteristics of an anisotropic earth formation as defined in claim 3 wherein decomposing the composite waveforms into decomposed waveforms further comprises:
  estimating a transfer function of the anisotropic earth formation comprising at least a strike angle for the anisotropy and an acoustic velocity;
  decomposing the first and third set of composite waveforms using the strike angle to create a first decomposed waveform;
  decomposing the second and fourth composite waveforms to create a second decomposed waveform; and
  applying the inverse of the estimated transfer function to the decomposed waveforms to create the estimated source waveforms.

5. The method of determining characteristics of an anisotropic earth formation as defined in claim 1 wherein comparing the estimated source waveforms to determine the characteristic of the anisotropic earth formation further comprises:
  calculating an objective function based on the estimated source waveforms; and
  determining the characteristic of the anisotropic earth formation based on a plot containing the objective function.

6. The method of determining characteristics of an anisotropic earth formation as defined in claim 5 wherein calculating an objective function based on the estimated source waveforms further comprises:
  averaging the estimated source waveforms to determine an average estimated source waveform; and
  determining a variance value of the estimated source waveforms using the average estimated source waveform, the variance value being the objective function.

7. The method of determining characteristics of an anisotropic earth formation as defined in claim 6 wherein averaging the estimated source waveforms to determine an average estimated source waveform further comprises determining the average estimated source waveform using substantially the following equation:

$$S_{EST_{AVG}}(t) = \frac{1}{N}\sum_{i=1}^{N} S_{EST_i}(t)$$

where $S_{EST_{AVG}}$ is the average estimated source waveform, N is the number of decomposed waveforms used to create the average estimated source signal, $S_{EST_i}$ is the estimated source waveform for each decomposed waveform, and t is time.

8. The method of determining characteristics of an anisotropic earth formation as defined in claim 6 wherein determining a variance value of the estimated source waveforms using the average estimated source waveform further comprises:

$$\delta^2 = \sum_{i=1}^{N} (S_{EST_i}(t) - S_{EST_{AVG}}(t))^2$$

where $\delta^2$ is the variance, $S_{EST_{AVG}}$ is the average estimated source waveform, N is the number of decomposed waveforms used to create the average estimated source signal, $S_{EST_i}$ is the estimated source waveform for each decomposed waveform, and t is time.

9. The method of determining characteristics of an anisotropic earth formation as defined in claim 6 further comprising:
  plotting multiple variance values calculated for multiple sets of estimated source waveforms; and
  determining inflection points of the variance values within the plot as indicative of acoustic velocity within the earth formation.

10. The method of determining characteristics of an anisotropic earth formation as defined in claim 9 wherein comparing the estimated source waveforms to determine the acoustic velocity further comprises finding locations where the inflection points are minimas.

11. The method of determining characteristics of an anisotropic earth formation as defined in claim 10 further comprising estimating an error in the determination of the characteristic of the anisotropic earth formation based on a value of the objective function at the minimas.

12. The method of determining characteristics of an anisotropic earth formation as defined in claim 10 further comprising estimating an error in the determination of the characteristic of the anisotropic earth formation based on a curvature of the plot of the value of the objective function at the minimas.

13. The method of determining characteristics of an anisotropic earth formation as defined in claim 1 wherein comparing the estimated source waveforms to determine the acoustic velocity further comprises:
  calculating a differences between each estimated source waveforms to obtain an objective function using substantially the following equation:

$$\zeta = \sum_{i=1}^{N-1} (S_{EST_{i+1}} - S_{EST_i})^2$$

where $\zeta$ is the objective function, and N is the number of decomposed waveforms, and $S_{EST_i}$ is the estimated source waveform for each decomposed waveform.

14. The method of determining characteristics of an anisotropic earth formation as defined in claim 13 wherein comparing the estimated source waveforms to determine the acoustic velocity further comprises:
  plotting multiple values of the objective function calculated for multiple sets of estimated source waveforms; and
  determining inflection points of the values of the objective function within the plot as indicative of acoustic velocity within the earth formation.

15. The method of determining characteristics of an anisotropic earth formation as defined in claim 14 wherein comparing the estimated source waveforms to determine the acoustic velocity further comprises finding locations where the inflection points are minimas.

16. The method of determining characteristics of an anisotropic earth formation as defined in claim 15 wherein an error in the determination of the acoustic velocity is proportional to the a curvature of the values of the objective function at the minimas.

17. The method of determining characteristics of an anisotropic earth formation as defined in claim 1 wherein comparing the estimated source waveforms to determine characteristics of the anisotropic earth formation further comprises comparing the estimated source waveforms to determine at least one of the fast and slow polarization shear wave acoustic velocities.

18. The method of determining characteristics of an anisotropic earth formation as defined in claim 1 wherein comparing the estimated source waveforms to determine characteristics of the anisotropic earth formation further comprises comparing the estimated source waveforms to determine a strike angle of the anisotropy.

19. The method of determining characteristics of an anisotropic earth formation as defined in claim 18 further comprising determining an error estimate of the strike angle by comparing an angle between the fast and slow polarization shear waves.

20. In an anisotropic earth formation where an induced shear wave breaks up into a fast polarization component and a slow polarization component, a method of determining characteristics of the earth formation comprising:
   a) generating acoustic signals with dipole transmitter pair by firing a first dipole transmitter, then firing a second dipole transmitter;
   b) receiving at a first dipole receiver pair acoustic energy composite signals containing information about both the fast and slow polarization components;
   c) receiving at a second dipole receiver pair acoustic energy composite signals containing information about both the fast and slow polarization components;
   d) decomposing the signals of the first dipole receiver pair into a first decomposed signal for a strike angle;
   e) decomposing the signals of the second dipole receiver pair into a second decomposed signal for the strike angle;
   f) estimating a an assumed slowness of the earth formation;
   g) estimating a first source wavelet based on the first decomposed signal;
   h) estimating a second source wavelet based on the second decomposed signal;
   i) comparing the first and second source wavelets to obtain an objective function;
   j) plotting the objecting function as a function of slowness of the assumed transfer function, a start time within the decomposed signals, and strike angle;
   k) repeating steps f) through j) for a plurality of assumed transfer functions;
   l) repeating steps f) through k) for a plurality of start times within the decomposed signal; and
   m) repeating steps d) through l) for a plurality of strike angles.

21. The method of determining characteristics of an earth formation as defined in claim 20 wherein decomposing the signals of the first dipole receiver pair into a first decomposed signal further comprises calculating the first decomposed signal using substantially the following equation:

$$DS(t) = \cos^2(\theta) R_{XX}(t) + \sin(\theta)\cos(\theta) [R_{XY}(t) + R_{YX}(t)] + \sin^2(\theta) R_{YY}(t)$$

where DS(t) is the decomposed signal, θ is the strike angle, $R_{XX}$ is a signal received by a first receiver of the first receiver pair with an axis oriented in an X direction when a transmitter in the X direction is fired, $R_{YX}$ is a signal received by the first receiver of the first receiver pair when a transmitter in a transmitter in the Y direction is fired, $R_{YX}$ is a signal received by a second receiver of the first receiver pair with an axis oriented in the Y direction when the transmitter oriented in the X direction is fired, and $R_{YY}$ is a signal received by the second receiver oriented in the Y direction when the transmitter oriented in the Y direction is fired.

22. The method of determining characteristics of an earth formation as defined in claim 20 wherein decomposing the signals of the second dipole receiver pair into a second decomposed signal further comprises calculating the first decomposed signal using substantially the following equation:

$$DS(t) = \cos^2(\theta) R_{XX}(t) + \sin(\theta)\cos(\theta) [R_{XY}(t) + R_{YX}(t)] + \sin^2(\theta) R_{YY}(t)$$

where DS(t) is the decomposed signal, θ is the strike angle, $R_{XX}$ is a signal received by a first receiver of the second receiver pair with an axis oriented in an X direction when a transmitter in the X direction is fired, $R_{XY}$ is a signal received by the first receiver of the second receiver pair when a transmitter in a transmitter in the Y direction is fired, $R_{YX}$ is a signal received by a second receiver of the second receiver pair with an axis oriented in the Y direction when the transmitter oriented in the X direction is fired, and $R_{YY}$ is a signal received by the second receiver oriented in the Y direction when the transmitter oriented in the Y direction is fired.

23. The method of determining a characteristic of an earth formation as defined in claim 20 wherein comparing the first and second source wavelets to obtain an objective function further comprises:
   calculating an average estimated source wavelet; and
   calculating a variance of the estimated source wavelets from the average estimated source wavelet.

24. The method of determining a characteristic of an earth formation as defined in claim 23 wherein calculating the average estimated source wavelet further comprises calculating the average estimated source wavelet using substantially the following equation:

$$S_{EST_{AVG}}(t) = \frac{1}{N} \sum_{i=1}^{N} S_{EST_i}(t)$$

where $S_{EST_{AVG}}$ is the average estimated source signal, N is the number estimated source wavelets, $S_{EST_i}$ is the estimated source wavelet, and t is time.

25. The method of determining a characteristic of an earth formation as defined in claim 24 wherein calculating a variance of the estimated source wavelets from the average estimated source wavelet further comprises calculating the variance using substantially the following equation:

$$\delta^2 = \sum_{i=1}^{N} (S_{EST_i}(t) - S_{EST_{AVG}}(t))^2$$

where $\delta^2$ is the variance.

26. The method of determining a characteristic of an earth formation as defined in claim 20 wherein comparing the first and second source wavelets to obtain an objective function further comprises determining a difference between the estimated source wavelets as the objective function.

27. The method of determining a characteristic of an earth formation as defined in claim 26 wherein determining a difference between the estimated source wavelets further comprises calculating an objective function using substantially the following equation:

$$\zeta = \sum_{i=1}^{N-1} (S_{EST_{i+1}} - S_{EST_i})^2$$

where $\zeta$ is the objective function, $S_{EST_i}$ is the estimated source wavelet, and N is the number of estimated source wavelets.

\* \* \* \* \*